United States Patent Office 3,542,753
Patented Nov. 24, 1970

3,542,753
REACTIVE MONOAZO PYRAZOLONE DYES
Kurt Brenneisen, Grenzach, Germany, assignor to Sandoz Ltd. (also known as Sandoz A.G.), Basel, Switzerland
No Drawing. Filed Oct. 9, 1967, Ser. No. 673,915
Claims priority, application Switzerland, Oct. 14, 1966, 14,888/66
Int. Cl. C09b 62/08, 62/24
U.S. Cl. 260—153                                8 Claims

ABSTRACT OF THE DISCLOSURE

Reactive dyes of the formula

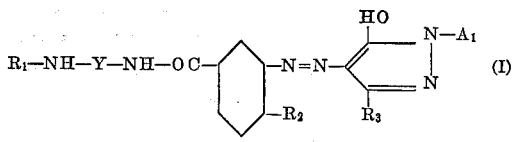

(I)

wherein $R_1$ is a reactive group,
$R_2$ is hydrogen, lower alkyl or chlorine,
$R_3$ is lower alkyl, —COOH, —COO-lower alkyl or optionally substituted —CO—$NH_2$,
$A_2$ is a benzene or naphthalene radical containing at least one —$SO_3H$ group and if desired further substituents and
Y is one of the radicals

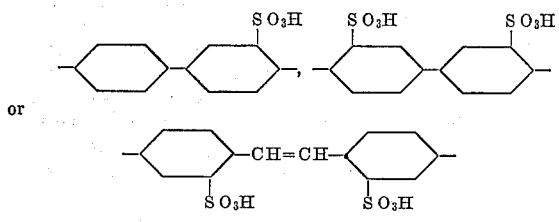

or

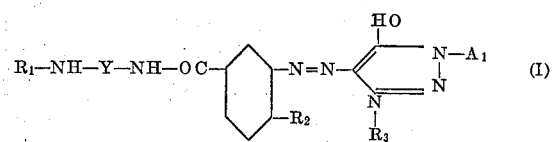

DESCRIPTION

This invention relates to reactive dyes of the formula

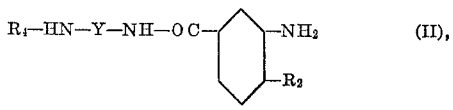

(I)

where $R_1$ stands for an acyl radical which bears at least one substituent cleavable as an anion and/or a C—C multiple linkage capable of additive reaction, or for a halogenopyrimidyl or halogenotriazinyl radical,
$R_2$ for hydrogen, lower alkyl (e.g. methyl) or chlorine,
$R_3$ for lower alkyl, COOH, COO-lower alkyl, or optionally substituted CO—$NH_2$,
$A_1$ for a benzene or naphthalene radical containing at least one sulfonic acid group and if desired further substituents, and
Y for one of the following radicals

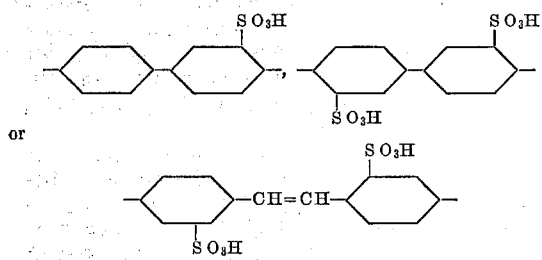

The process for the production of the reactive dyes of the Formula I consists in reacting the diazo compound of an amine of formula

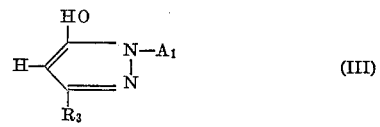

(II), where $R_4$ has one of the aforecited meanings of $R_1$ or stands for a non-reactive acyl radical, with a pyrazolone of formula $$\begin{array}{c} HO \\ | \\ H-{\overset{\displaystyle \phantom{x}}{=}}{-}{\overset{\displaystyle N-A_1}{\underset{\displaystyle N}{|}}} \\ | \\ R_3 \end{array}$$ (III)

so that coupling takes place in ortho-position to the enolic hydroxyl group, after which, when $R_4$ stands for a non-reactive acyl radical, the resulting monoazo dye is de-acylated and reacted with an acylating agent containing at least one substituent cleavable as an anion and/or a C—C multiple linkage capable of additive reaction, or with a polyhalogenopyrimidine or polyhalogenotriazine.

When $R_1$ is an acyl radical containing at least one substituent cleavable as an anion and/or a C—C multiple linkage capable of additive reaction, it may be, e.g., the radical of a lower aliphatic acid bearing at least one halogen atom or one group cleavable as an anion, such as Br, cl or —O—$SO_3H$, and/or a C—C double bond capable of additive reaction; such acids are, e.g., chloroacetic, bromacetic, β-chloropropionic, β-bromopropionic, α,β-dichloropropionic, α,β-dibromopropionic, acrylic, methacrylic, α-chloracrylic, α-bromacrylic, γ-chlorocrotonic, γ-bromocrotonic, α,β- and β,β-dichloroacrylic, α,β- or β,β-dibromoacrylic, trichloroacrylic, tribromoacrylic, β-chloroethyl-sulfonic, β-bromoethyl-sulfonic, β-sulfatopropionic, β-sulfatoethylsulfonic, vinylsulfonic, β-methylsulfonyloxy-, β-phenylsulfonyloxy- or β-(4'-methylphenylsulfonyloxy)-propionic acid; $R_1$ may also be the radical of a halogenated heterocyclic acid, e.g. 2,4-dichloro- or 2,4-dibromopyrimidine-5-carboxylic acid, 2,4-dichloro- or 2,4-dibromo-6-methyl- or -6-chloromethylpyrimidine-5-carboxylic acid, 2,3-dichloro- or 2,3-dibromoquinoxaline-5- or -6-carboxylic acid or -sulfonic acid, 2(3)-monobromo- or 2(3)-monochloroquinoxaline-6-carboxylic acid, 1,4-dibromo- or 1,4-dichlorophthalazine-6-carboxylic acid, 2-bromo- or 2-chlorobenzoxazole-5-, -6- or -7-carboxylic acid, 2-bromo- or 2-chlorobenzothiazole-5-carboxylic acid or -6-sulfonic acid, 3- or 4-(4',5'-dichloro- or -(4',5'-dibromo-6'-pyridazonyl-1')-benzene-1-carboxylic acid or β-(4',5'-dichloro- or -(4',5'-dibromo-6'-pyridazonyl-1')-propionic acid. When $R_1$ is a halogenopyrimidyl or halogenotriazinyl radical, it is, e.g., the radical of a polyhalogenopyrimidine or polyhalogenotriazine containing at least two mobile halogen atoms, e.g. the radical of cyanuric chloride or cyanuric bromide or the primary condensation products of a cyanuric halide of formula

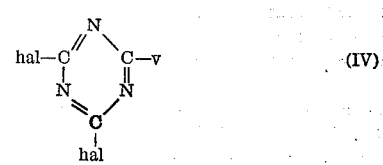

(IV)

where hal represents chlorine or bromine and v the radical which may be further substituted, of a primary or secondary aliphatic, alicyclic, aromatic or heterocyclic amine, an aliphatic, alicyclic, aromatic or heterocyclic hydroxyl or thiol compound, in particular the radical of aniline, its alkyl, sulfonic acid or carboxylic acid derivatives, of ammonia, lower monoalkylamines or dialkylamines; the radical of 2,4,6-trichloropyrimidine, 2,4,6-tribromopyridine and their derivatives which may bear the following substituents in the 5-position: methyl, ethyl, cyano, carboxy, carboxylic acid methyl or ethyl ester, chlorovinyl, substituted alkyl, e.g. carboxymethyl, chloromethyl or bromomethyl; the radical of 2,4,5,6-tetrachloro- or -tetrabromopyrimidine, 5-bromo - 2,4,6 - trichloropyrimidine, 2,4-dichloro-5-chloromethyl- or 2,4-dibromo-5-bromomethylpyrimidine, 2,4-dichloro-5-chloromethyl-6-methyl- or 2,4-dibromo-5-bromomethyl-6-methylpyrimidine.

The substituent $R_3$ stands preferably for methyl, ethyl, carboxyl, —COO—CH$_3$, —COO—C$_2$H$_5$, —CO—NH$_2$, —CONH—CH$_3$, —CO—NH—C$_2$H$_5$, —CO—NH—C$_4$H$_9$, —CO—NH—C$_2$H$_4$—OH, —CO—N(CH$_3$)$_2$.

The aryl radical $A_1$ containing at least one sulfonic acid group may be, e.g., 2-, 3- or 4-sulfophenyl, 2,4-, 2,5- or 3,5-disulfophenyl, 2-methyl-4- or -5-sulfophenyl, 2-chloro-4- or -5-sulfophenyl, 2,5-dichloro-4-sulfophenyl, 2,3,6-trichloro-5-sulfophenyl, 2-methyl-6-chloro-4-sulfophenyl, 4- methyl- or 4-chloro-2-sulfophenyl, 4-, 6- or 7-sulfonaphthyl-1, 3,6-, 4,6-, 4,7- or 5,7-disulfonaphthyl-1, 5-, 6-, 7- or 8-sulfonaphthyl-2, 4,7-, 4,8-, 5,7- or 6,8-disulfonaphthyl-2.

The amine of Formula II can be diazotized by the direct or indirect method at 0° to 30° C., or preferably at 15–20° C. The coupling reaction with the pyrazolone of Formula III is best effected at 0° to 40° C. or preferably at 15–25° C. and at a pH of 5 to 12 or preferably 7 to 10, the alkali required for neutralization being preferably added gradually in small portions.

When the radical $R_4$ in the amine of Formula II stands for a reactive radical $R_1$, the dye can be precipitated, e.g. by the addition of salt, and then filtered off, washed with salt solution and dried.

When the radical $R_4$ in the amine of Formula II represents a non-reactive acyl radical, it is split off by hydrolysis. Cleavage can be effected in mineral acid medium, e.g. in 2 to 6% hydrochloric or sulfuric acid solution, or in alkaline medium, e.g. 1 to 5% sodium hydroxide or potassium hydroxide solution, at temperatures from 70° C. to the boiling point of the solution.

An aqueous medium is best suited for reacting the aminoazo dye and the reactive component. To introduce the aliphatic acyl radicals that bear at least one substituent cleavable as an anion and/or a C—C multiple linkage capable of additive reaction, it is convenient to employ the acid halides or anhydrides or isocyanates and to work with good cooling in the presence of an acid-binding agent, e.g. sodium carbonate, sodium hydroxide, barium hydroxide, calcium hydroxide or sodium acetate.

The carboxylic acid halide employed for acylation can be added as it is or it can be dissolved in two to five times its amount of an inert organic solvent such as benzene, chlorobenzene, methylbenzene, dimethylbenzene or acetone, and the solution dropped into the aqueous solution of the compound bearing the amino group at 0° to 30° C. or preferably about 2–5° C. in the presence of an acid-binding agent, preferably at pH 7 to 3.

For the carboxylic acid or sulfonic acid halides of the halogenated heterocyclic compounds the temperatures may vary from 0° to 100° C., e.g. 0° to 50° C. or preferably, 0° to 25° C. for the 2,4-dihalogenopyrimidine-5-carboxylic acid halides, about 10 to 50° C. or preferably 20° to 30° C. for the 3- or 4-(4',5'-dihalogeno-6'-pyridazonyl-1')-benzene-carboxylic acid chlorides or the β-(4',5'-dihalogeno - 6' - pyridazonyl-1')-propionic acid chlorides, about 20° to 90° C. for the halogenoquinoxaline, -phthalazine-, -benzoxazole- or -benzothiazole-carboxylic acid chlorides or-sulfonic acid chlorides, and preferably about 30° to 70° C. for the 2,3-dihalogenoquinoxaline-5- or 6- carboxylic acid chloride or -6-sulfonic acid chloride. The reaction is conducted advantageously in a weakly alkaline, neutral to weakly acid medium, preferably within the pH range of 7 to 3, e.g. pH 6 to 4.

The reaction with the polyhalogenopyrimidines or polyhalogenotriazines is also carried out in aqueous medium. The halide can be employed as it is or in solution in an organic inert solvent, suitable solvents for this purpose being acetone, chloroform, benzene, chlorobenzene and toluene.

The reaction temperature is adjusted to the reactivity of the starting products and varies from 0° to 100° C. It may be 0° to 20° C. for cyanuric chloride and cyanuric bromide, 30–50° C. for the monocondensation products containing two mobile halogen atoms obtained with cyanuric chloride or bromide and ammonia, a primary or secondary amine, an alcohol, thioalcohol, phenol or thiophenol, or 20–100° C. for the polyhalogenopyrimidines. If temperatures higher than about 40° C. have to be employed it is advisable to work in a vessel fitted with a reflux condenser, in view of the volatility of halogenopyrimidines in water vapour. The reaction can be carried out in weakly alkaline, neutral to weakly acid medium, but the pH region of 7 to 3 is preferable.

To maintain a constant pH value during the reaction of the aminoazo dye with the reactive component, an acid-binding agent such as sodium acetate can be added to the reaction solution at the commencement of the operation, or sodium or potassium carbonate or bicarbonate in solid pulverized form or in concentrated aqueous solution can be added in small portions in the course of the reaction. Aqueous solutions of sodium or potassium hydroxide are other suitable neutralizing agents.

The addition of small amounts of a wetting or emulsifying agent can accelerate the rate of reaction.

The monoazo dyes formed can be precipitated from their aqueous solutions or suspensions with salt, filtered off, washed with salt solution if necessary, and dried.

Especially interesting dyes are those of the formula

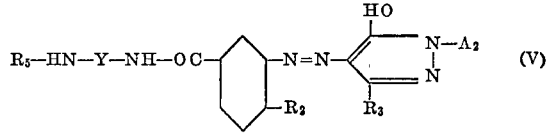

wherein
$R_2$, $R_3$ and Y have the aforecited meanings and
$A_2$ represents mono- or disulfophenyl, mono- or disulfonaphthyl, methyl-sulfophenyl, monochloro-, dichloro- or trichlorosulfophenyl or methyl-chlorosulfophenyl and
$R_5$ represents the radical of a lower aliphatic acid bearing at least one halogen atom or one group cleavable as an anion and/or a C—C double bond capable of additive reaction, such radicals being e.g. lower mono- or dihalogenoalkanoyl, lower alkenoyl, lower mono-, di- or trihalogenoalkenoyl, lower sulfato-alkanoyl, lower alkanesulfonyloxy-lower alkanoyl, mono-nuclear arylsulfonyloxy- lower alkanoyl, lower monohalogeno-alkylsulfonyl, lower sulfatoalkylsulfonyl, lower alkenylsulfonyl; the radical of a halogenated heterocyclic acid containing one nitrogen atom and a second hetero atom selected from the group consisting of nitrogen, oxygen and sulfur and in which the halogen atom or atoms are bound to carbon atoms of the heterocyclic ring, such radicals being e.g. 2,4-dihalogenopyrimidyl-5-carbonyl, 2,4 - dihalogeno - 6-methylpyrimidyl-5-carbonyl, 2,3-dihalogenoquinoxalyl-5-carbonyl, -6-carbonyl, -6-sulfonyl or -6-aminocarbonyl, 2(3)-monohalogenoquinoxalyl - 6 - carbonyl, 1,4-dihalogeno-phthalazyl-6-carbonyl, 2 - halogenobenzoxazolyl-5-, -6- or -7-carbonyl, 2-halogenobenzothiazolyl-5-carbonyl or -6-sulfonyl, 3- or 4-(4',5'-dihalogeno-6'-pyridazonyl-1')-benzene-1-carbonyl or β-(4',5'-dihalogeno-6'-pyridazonyl-1')-propionyl; the radical of a polyhalogenopyrimidine, e.g. mono-, di- or trihalogenopyrimidyl, 2,4-dihalogenopyrimidyl-5-methylene or 2,4-dihalogeno-6-methylpyrimidyl-5-methylene; the radical of a polyhalogenotriazine, e.g. 4,6-dihalogeno-1,3,5-triazinyl - 2,4 - lower alkoxy-6-halogeno-1,3,5-triazinyl-2, 4-mononuclear aryloxy-6-halogeno-1,3,5-triazinyl-2, 4-amino-6-halogeno-1,3,5-triazinyl- 2 or 4-substituted amino-6-halogeno-1,3,5-triazinyl-2-, halogeno meaning chloro or bromo, "lower" meaning containing up to 4 carbon atoms and the substituents of the amino group being selected from the group consisting of lower alkyl, lower hydroxyalkyl, lower alkoxy- lower alkyl, lower carboxyalkyl, lower sulfoalkyl, phenyl, chlorophenyl, methylphenyl, carboxyphenyl, dicarboxyphenyl, sulfophenyl, disulfophenyl, sulfonaphthyl, disulfonaphthyl, benzyl and cyclohexyl.

A sub-group of the dyes of Formula V encompasses the dyes of the formula

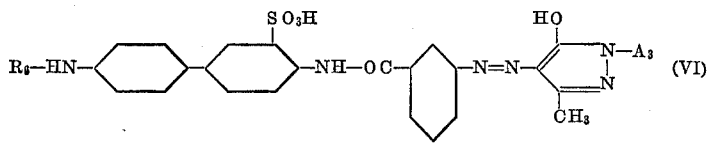

wherein

A₃ represents 3- or 4-sulfophenyl, 2,4-, 2,5- or 3,5-disulfophenyl, 2-chloro-4- or -5-sulfophenyl, 2-methyl-4- or -5-sulfophenyl, 2,5-dichloro-4-sulfophenyl or 2-chloro-6-methyl-4-sulfophenyl and R₆ represents 2,6-dichloro-pyrimidyl-4, 4,6-dichloro-pyrimidyl-2, 2,5,6-trichloropyrimidyl-4, 2,4-dichloro-6-methyl-pyrimidyl-5-methylene, 4,6-dichloro - 1,3,5 - triazinyl-2, 6-chloro-4-amino-1,3,5-triazinyl-2, 6 - chloro - 4-methylamino-1,3,5-triazinyl-2, 6-chloro-4-methoxy-1,3,5-triazinyl-2, 6-chloro-4-(3'- or 4'-sulfophenylamino)-1,3,5-triazinyl-2, β-chloropropionyl, acryloyl, α-chloro- or α-bromoacryloyl, β-(4',5'-dichloro-6'-pyridazonyl-1')-propionyl, 2,3-dichloroquinoxalyl-6-carbonyl or 2-chlorobenzothiazolyl-6-sulfonyl.

The new reactive dyes have good substantivity, i.e. affinity for cellulosic fibers, good stability to hard water and good compatibility with salt. They dissolve well in water, which permits them to be applied at a liquor to goods ratio of 10:1 or in many cases 3:1, while the unfixed proportion of dye can be easily washed off after dyeing. The dyes are well stable to lengthy boiling times in the dyebath, are stable to alkalis and not appreciably sensitive to reducing influences. In an alkaline bath they cover barry viscose rayon, and from acid baths they dye wool, silk and polyamide fibers. They reserve polyester, polyacrylonitrile, polyvinyl chloride, cellulose-triacetate and polyalkylene fibers. The dyes are well suitable for dyeing or padding wool, silk, polyamide fibers, natural and regenerated cellulosic fibers, e.g. cotton, linen, viscose filament yarn, viscose staple fibers and cuprammonium rayon, etc. and blends of these fibers. They are also suitable for leather. The optimum conditions of application are governed by the nature of the fiber and the dyes used. Animal and polyamide fibers can be dyed or fixed in an acid, neutral or weakly alkaline medium, e.g. in the presence of acetic, formic or sulfuric acid, ammonium sulfate, sodium metaphosphate, etc. Dyeing can be carried out in an acetic acid to neutral bath in the present of levelling agents, e.g. polyoxyethylated fatty amines or mixtures of these and alkylpolyglycol ethers, and the bath adjusted to a neutral or weakly alkaline reaction at the end of dyeing by the addition of small amounts of an agent of alkaline reaction, e.g. ammonia, sodium carbonate or bicarbonate, or of compounds which react neutral on heating, e.g. hexamethylene tetramine or urea. Subsequently the goods are rinsed well and if necessary acidified with acetic acid. The dyeings obtained are of brilliant greenish yellow to reddish yellow shade and have good light fastness in the dry and wet states, together with very good fastness to wet tests such as water, water spotting, washing, milling, perspiration, wet rubbing and acid cross dyeing. They withstand acid vapours, sulfurous acid and even strong acids such as sulfuric acid, and are fast to dry cleaning.

An alkaline medium is preferable for the dyeing, padding or fixation of the dyes on cellulosic fibers; suitable alkalis include sodium carbonate and bicarbonate, sodium or potassium hydroxide solution, sodium metasilicate, sodium borate, tri-sodium phosphate, ammonia. It is often of advantage to add a mild oxidizing agent, e.g., sodium 1-nitrobenzene-3-sulfonate, to the dyeing or padding medium to obviate reduction effects. Dyeings on cellulosic fibers can be fixed at room temperature or with heating, depending on the reactive group of the dye.

The dyeings on cellulosic fibers have extremely good wet fastness properties owing to the formation of a stable chemical linkage between the dye molecule and the cellulose molecule.

Often the total amount of dye applied does not take part in the chemical reaction with the fiber. In these cases the unreacted proportion of dye is removed by suitable treatment, such as rinsing and/or soaping, if necessary at high temperature. For this purpose synthetic detergents can be used, e.g. alkylarysulfonates such as sodium dodecylbenzenesulfonate, alkylsulfates such as sodium cetyl sulfate or sodium lauryl sulfate, or alkyl-, monoalkylphenyl- or dialkylphenylpolyglycol ethers which may be sulfated or carboxymethylated, such as sodium lauryl polyglycol ether sulfate.

Brilliant yellow dyeings of good tinctorial strength are obtained which have good fastness to light in the dry and wet states and very good fastness to wet tests such as water, water spotting, washing, perspiration, soda boiling, alkali, wet rubbing, and acid cross dyeing. They show good stability to acid vapours, sulfurous acid and even strong acids such as sulfuric acid, and are fast to dry cleaning and stable to resin finishes.

The new dyes can be combined with other reactive dyes, e.g. blue anthraquinone, red azo or turquoise copper phthalocyanine dyes, to produce yellow-red, blue or green dyeings. These combination dyeings are not subject to catalytic fading and have very good light fastness in the wet state.

The dyes of the present invention have better light fastness than the next comparable dyes disclosed in British patent specifications Nos. 852,120 and 828,353, which do not contain the bridge

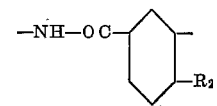

In the following examples the parts and percentages are by weight and the temperatures are in degrees centigrade.

EXAMPLE 1

42.5 parts of 4-(3''-aminobenzoylamino)-4'-acetylamino-1,1'-diphenyl-3-sulfonic acid are suspended in 600 parts of water and 15 parts of 30% hydrochloric acid at 20° with thorough stirring and are diazotized with 6.9 parts of sodium nitrite. 35 parts of sodium 1-(2'-chlorophenyl)-3-methyl-5-pyrazolone-5'-sulfonate are added, and subsequently 20 parts of sodium carbonate to effect coupling. The dye thus formed is suspended in the demium, but on heating to 90° it goes into solution, on which 130 parts of 30% hydrochloric acid are added and the soluton stirred for 1 hour at 85–90° to carry out the deacetylation. The aminomonoazo dye is then filtered off with suction and dissolved in 700 parts of water at 90° and at a pH value of 7. At the same temperature 22 parts of 2,4,5,6-tetrachloropyrimidine are added with stirring, and the pH value is then maintained at 6–7 by dropping in sodium carbonate solution until the condensation reaction is complete. The dye is precipitated by the addition of sodium chloride, filtered off and dried. On grinding it is obtained as a yellow powder which dissolves in water with a greenish yellow colour.

DYEING METHOD

A dyebath is prepared with 2 parts of the dye of Example 1 in 4000 parts of softened water at 40°. 100 parts of a cotton fabric, mercerized and previously wetted out, are entered into the bath, after which 110 parts of calcined sodium sulfate and 30 parts of calcined sodium carbonate are added. The bath is raised to 100° in 30 minutes, with a further 110 parts of calcined sodium sulfate added after 10 minutes and 100 parts after 20 minutes. On reaching the boil a final 50 parts of calcined sodium carbonate are added and the bath is then held at the boil for 1 hour. The cotton is then removed, rinsed with water and dried; it is dyed fast to light and wet treatments in a greenish yellow shade.

EXAMPLE 2

63.5 parts of the amino compound of formula

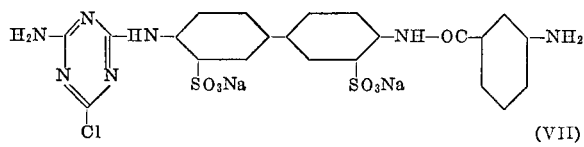

(VII)

are suspended in 500 parts of water and 30 parts of 30% hydrochloric acid. The compound is diazotized at 20° with 6.9 parts of sodium nitrite, following which 35 parts of sodium 1-(2',5'-dichlorophenyl)-3-methyl-5-pyrazolone-4'-sulfonate are added and the coupling reaction carried out with the addition of sodium carbonate. The dye is isolated as given in Example 1. It is a yellow powder which dissolves in water with a yellow colour and dyes cellulosic fibers by the dyeing method of Example 1 in greenish yellow shades of good light and wet fastness.

EXAMPLE 3

115 parts of the amino compound of formula

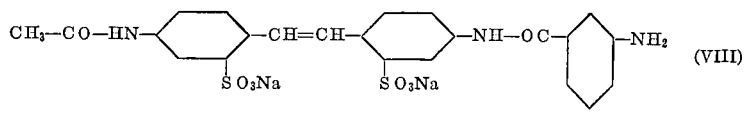

are suspended in 2500 parts of water and 62 parts of 30% hydrochloric acid with thorough stirring. Ice is added to bring the temperature down to 15° and the compound is then diazotized with 13.8 parts of sodium nitrite. 68 parts of sodium 1-(2'-chlorophenyl)-3-methyl-5-pyrazolone-4'-sulfonate are entered at 15–20° and coupling effected by the slow addition of 40 parts of sodium carbonate. The resulting dye suspension is heated to 90°, on which the dye goes into solution. After the addition of 250 parts of 30% hydrochloric acid the solution is stirred for 1 hour at 85–90°. The aminomonoazo dye of formula

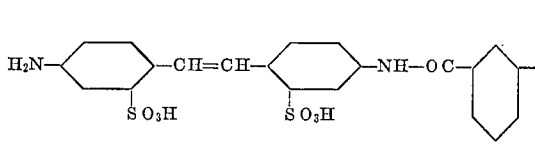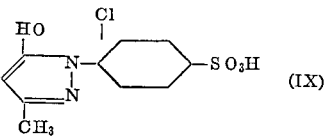

(IX)

settles out in the form of the disodium salt. It is filtered off, washed with brine and dried.

83.2 parts of the disodium salt of the aminomonoazo dye of Formula IX are dissolved in 750 parts of water and 13.3 parts of 30% sodium hydroxide solution at 80°. 17.4 parts of 2,4,6-trichloropyrimidine are dropped in with stirring, and while the condensation reaction is in progress, 15% sodium carbonate solution is added to maintain the pH value at 5.5 to 6.5. The reaction is complete when no further alkali is consumed. The dye is salted out, filtered off, washed with brine and dried. It is a yellow powder which dissolves in water with a yellow colour and gives greenish yellow dyeings of good light and wet fastness on cellulosic fibers.

The 2,4,6-trichloropyrimidine may be replaced by an equivalent amount of 2,4,6-tribromopyrimidine, on which a similar dye is obtained.

EXAMPLE 4

41.6 parts of the disodium salt of the amino dye of Formula IX are stirred at room temperature into 600 parts of water containing 6.7 parts of 30% sodium hydroxide solution. After cooling to 0° a solution of 9.3 parts of cyanuric chloride in 20 parts of chloroform is dropped in with vigorous stirring. The temperature is maintained at 0–5° and the pH value at 5.5–6.5 by dropwise addition of 20% sodium carbonate solution, with continuous stirring until no further amino dye is indicated. The final dye is salted out, filtered off, washed with brine and vacuum dried at 40°. On grinding a yellow powder is obtained which dissolves in water with a greenish yellow colour. To increase its stability the powder dye is intimately mixed with 10 parts of a phosphate buffer having a pH value of 7.0.

Dyeing method

The dyebath is prepared with 2 parts of the dye of this example dissolved in 3000 parts of softened water at 40°. 100 parts of a previously wetted out fabric of cotton or viscose rayon are entered into the bath, which is then raised to 60° over 30 minutes with the gradual addition of 100 parts of calcined sodium sulfate. At this point 6 parts of sodium hydrogen carbonate are added and the bath is held at 60° for a further 30 minutes. Then 6 parts of calcined sodium carbonate are added in portions over 10 minutes and the bath is maintained at 60° for a final 15 minutes. The fabric is removed, rinsed with hot water, soaped at the boil with a 0.3% solution of a non-ionic detergent, rinsed again and dried. A greenish yellow dyeing fast to light and wet treatments is obtained.

EXAMPLE 5

41.6 parts of the disodium salt of the amino dye of Formula IX are reacted with 9.3 parts of cyanuric chloride as described in Example 4. After the addition of a solution of 9.75 parts of sodium 1-aminobenzene-4-sulfonate in 90 parts of water, the reaction mixture is stirred for a few hours at 45–50° with dropwise addition of 15% sodium carbonate solution to maintain the pH value at 6.0–6.5. On completion of the reaction the monochlorotriazine dye is salted out, filtered off and dried. Dyed on cotton and regenerated cellulosic fibers by the method described after Example 1, it gives greenish yellow dyeings.

An identical dye is obtained when 41.6 parts of the disodium salt of the amino dye of Formula IX are dissolved in 600 parts of water at room temperature, the solution combined with a solution of 17.5 parts of sodium 4-(4',6'-dichloro-1',3',5'-triazinyl-2'-amino)-benzene-1-sulfonate in 180 parts of water, and the reaction conducted by stirring for a few hours at 45–50° with dropwise addition of 15% sodium carbonate solution to keep a constant pH value of 5–6.

EXAMPLE 6

41.6 parts of the disodium salt of the amino dye of Formula IX are dissolved in 600 parts of water and 6.7 parts of 30% sodium hydroxide solution at 40–45°. Into this solution is dropped a solution of 14 parts of 2,3-dichloroquinoxaline-6-carboxylic acid chloride in 50 parts of benzene with vigorous stirring at 40–45° and with the addition of 15% sodium carbonate solution to maintain the pH value at 6–6.5. When no further free amino group is indicated, the dye is salted out, filtered off and vacuum dried at 40–50°. On grinding it is obtained as a yellow powder which dissolves in water with a greenish yellow colour and dyes cellulosic fibers in light- and wet-fast greenish yellow shades.

Similar dyes are obtained when the 2,3-dichloroquinoxaline-6-carboxylic acid chloride is replaced by the equivalent amount of 2,3-dichloroquinoxaline-6-sulfonic acid chloride or -6-isocyanate.

EXAMPLE 7

41.6 parts of the disodium salt of the amino dye of Formula IX are mixed with 600 parts of water and 6.7 parts of 30% sodium hydroxide solution at room temperature. The mixture is cooled to 0–2° and 14 parts of β-chloropropionic acid chloride are dropped into it, with the further addition of 20% sodium carbonate solution to maintain the pH value at 5–6. When acylation is complete the dye is salted out, suctioned off, dried and ground, on which it is obtained as a yellow powder which dissolves in water with a yellow colour and gives greenish yellow dyeings fast to light and wet treatments on cellulosic fibers.

The following table gives details of further monoazo dyes fo Formula I which are obtainable by the procedures described in Examples 1 to 7. They are distinguished by the meanings of the radicals Y, $A_1$, $R_1$, $R_2$ and $R_3$ and the shade of the dyeings on cellulosic or polyamide fibers.

TABLE 1

| Example No. | Y | $A_1$ | $R_1$=Radical of | $R_2$ | $R_3$ | Shade of dyeing |
|---|---|---|---|---|---|---|
| 8 | ⌬—⌬—SO₃H | 2-chloro-4-sulfophenyl | 2,4,5,6-tetrachloropyrimidine | H | CH₃ | Greenish yellow. |
| 9 | Same as above | 4-sulfophenyl | do | H | CH₃ | Do. |
| 10 | do | 5,7-disulfonaphthyl-2 | do | H | CH₃ | Yellow. |
| 11 | do | do | 5-bromo-2,4,6-trichloropyrimidine | H | CH₃ | Do. |
| 12 | do | 4,8-disulfonaphthyl-2 | 2,4,6-trichloropyrimidine | H | CH₃ | Do. |
| 13 | do | 6,8-disulfonaphthyl-2 | do | H | CH₃ | Do. |
| 14 | do | do | 2,4-dichloro-6-amino-1,3,5-triazine | H | CH₃ | Do. |
| 15 | do | 3-sulfophenyl | Acrylic acid chloride | H | CH₃ | Greenish yellow. |
| 16 | ⌬—CH=CH—⌬ (SO₃H, SO₃H) | 4-sulfophenyl | 2,4,5,6-tetrachloropyrimidine | H | CH₃ | Do. |
| 17 | Same as above | do | do | CH₃ | CH₃ | Do. |
| 18 | do | do | do | H | COOH | Reddish yellow. |
| 19 | do | 2-chloro-5-sulfophenyl | do | H | CH₃ | Greenish yellow. |
| 20 | do | 2-methyl-4-sulfophenyl | do | H | CH₃ | Do. |
| 21 | do | 2,5-dichloro-4-sulfophenyl | do | H | CH₃ | Do. |
| 22 | do | 2-chloro-6-methyl-4-sulfophenyl | do | H | CH₃ | Do. |
| 23 | do | 5,7-disulfonaphthyl-2 | do | H | CH₃ | Yellow. |
| 24 | do | 4,8-disulfonaphthyl-2 | do | H | CH₃ | Do. |
| 25 | do | 6,8-disulfonaphthyl-2 | do | H | CH₃ | Yellow. |
| 26 | do | 4-sulfophenyl | 2,4,5,6-tetrachloropyrimidine | H | CH₃ | Greenish yellow. |
| 27 | do | do | 2,4-dichloro-6-β-hydroxyethylamino-1,3,5-triazine | H | CH₃ | Do. |
| 28 | do | do | 2,4-dichloro-6-phenylamino-1,3,5-triazine-3'-sulfonic acid | H | CH₃ | Do.¹ |
| 29 | do | do | α-chloroacrylic acid chloride | H | CH₃ | Do. |
| 30 | do | do | 2,4-dichloro-6-β-sulfoethylamino-1,3,5-triazine | H | CH₃ | Do. |
| 31 | do | do | 2,4-dichloro-6-carboxymethylamino-1,3,5-triazine | H | CH₃ | Do. |
| 32 | do | do | α,β-dichloropropionic acid chloride | H | CH₃ | Do.¹ |
| 33 | do | do | 2,4-dichloro-6-methylamino-1,3,5-triazine | H | CN₃ | Do. |
| 34 | ⌬—⌬—SO₃H | 2-chloro-4-sulfophenyl | 2,4-dibromo-6-amino-1,3,5-triazine | H | CH₃ | Do: |
| 35 | Same as above | do | 2,4-dichloro-6-phenylamino-1,3,5-triazine-4'-sulfonic acid | H | CH₃ | Do. |
| 36 | do | 2,5-dichloro-4-sulfophenyl | do | H | CH₃ | Do. |
| 37 | do | 2-chloro-5-sulfophenyl | 2,4,6-trichloropyrimidine | H | CH₃ | Do. |
| 38 | do | do | do | H | CH₃ | Do. |
| 39 | do | 2-methyl-5-sulfophenyl | 2,4,6-trichloropyrimidine | H | CH₃ | Do. |
| 40 | do | 2-methyl-4-sulfophenyl | 2,4,5,6-tetrachloropyrimidine | H | CH₃ | Do. |
| 41 | do | 4-meth 1,2-sulfophenyl | do | H | COOH | Do. |
| 42 | do | 4-chloro-2-sulfophenyl | do | H | CH₃ | Yellow. |
| 43 | do | 2,4-disulfophenyl | 2,4-dichloro-6-phenylamino-1,3,5-triazine | H | CH₃ | Greenish yellow. |
| 44 | do | 4-sulfonaphthyl-1 | do | H | CH₃ | Yellow. |
| 45 | do | 6-sulfonaphthyl-2 | 2,4-dichloro-6-phenylamino-1,3,5-triazine-2',5'-disulfonic acid | H | CH₃ | Do. |

TABLE 1—Continued

| Example No. | Y | A₁ | R₁ = Radical of | R₂ | R₃ | Shade of dyeing |
|---|---|---|---|---|---|---|
| 46 | ⌬-SO₃H (phenyl-SO₃H) | do | 2,5-disulfophenyl | 2,4-dichloro-6-N-methyl-N-phenyl-amino-1,3,5-triazine | H | CH₃ | Greenish yellow. |
| 47 | | do | do | 2,4-dichloro-6-(4′-methylphenylamino)-1,3,5-triazine | H | CH₃ | Do. |
| 48 | | do | do | 2,4-dichloro-6-benzylamino-1,3,5-triazine | H | CH₃ | Do. |
| 49 | ⌬-SO₃H / SO₃H (disulfophenyl) | 2-chloro-5-sulfophenyl | 2,4,6-trichloropyrimidine | C₂H₅ | CH₃ | Do. |
| 50 | —CH=CH— structure with SO₃H groups | 4-sulfophenyl | do | H | CO—NH₂ | Yellow. |
| 51 | ⌬-SO₃H / SO₃H (naphthyl) | 3,6-disulfonaphthyl-1 | do | H | CH₃ | Do. |
| 52 | Same as above | 4,6-disulfonaphthyl-1 | 2,4-dichloro-6-ethylamino-1,3,5-triazine | H | CH₃ | Do. |
| 53 | do | 6-sulfonaphthyl-1 | 2,4-dichloro-6-di-(β-hydroxyethyl)-amino-1,3,5-triazine | H | CH₃ | Do. |
| 54 | do | 5-sulfonaphthay-1 | 2,4-dichloro-6-N-methyl-N-β-sulfoethylamino-1,3,5-triazine | H | CH₃ | Do. |
| 55 | do | 2,5,6-trichloro-3-sulfophenyl | 2,4-dichloro-6-phenylamino-1,3,5-triazine-2′,4′-disulfonic acid | H | CH₃ | Greenish yellow. |
| 56 | do | 3,5-disulfophenyl | 2,4-dichloro-6-cyclohexylamino-1,3,5-triazine | H | CH₃ | Greenish yellow. |
| 57 | do | 2,5-disulfophenyl | 2,4,6-tribromo-1,3,5-triazine | H | CH₃ | Do. |
| 58 | do | do | 2,4-dichloro-6-n-butylamino-1,3,5-triazine | H | CH₃ | Do. |
| 59 | do | do | 2,4-dichloro-6-diethylamino-1,3,5-triazine | H | CH₃ | Do. |
| 60 | do | do | 2,4-dichloro-6-(3′-methoxybutyl-amino)-1,3,5-triazine | H | CH₃ | Do. |
| 61 | do | do | 2,4-dichloro-6-phenylamino-1,3,5-triazine-3′-sulfonic acid | H | CH₃ | Do. |
| 62 | do | 4-sulfophenyl | do | H | COOH | Yellow. |
| 63 | do | do | do | H | —CO—NH—C₄H₉ | Do. |
| 64 | do | do | do | H | —CO—N(CH₃)—C₂H₅ | Do. |
| 65 | do | do | do | H | —CO—N(C₂H₅)₂ | Do. |
| 66 | do | do | do | H | —COOCH₃ | Do. |
| 67 | do | 2,4,6-trichloropyrimidine-5-acetic acid | | H | CH₃ | Do. |
| 68 | do | 2-chloro-4-sulfophenyl | 2,4,5,6-tetrachloropyrimidine | H | CH₃ | Greenish yellow. |
| 69 | do | do | 2,4,6-trichloro-5-methylpyrimidine | Cl | CH₃ | Do. |
| 70 | do | do | 2,4,6-trichloro-5-chloromethylpyrimidine | H | CH₃ | Do. |
| 71 | do | do | 2,4-dichloro-5-chloromethyl-6-methylpyrimidine | H | CH₃ | Do. |
| 72 | do | do | 2,4-dichloropyrimidine-5-carboxylic acid chloride | H | CH₃ | Do. |
| 73 | do | do | α,β-dibromopropionic acid chloride | H | CH₃ | Do. |
| 74 | do | do | γ-chlorocrotonic acid chloride | H | CH₃ | Do. |
| 75 | do | do | 2-chlorobenzothiazole-5-carboxylic acid chloride | H | CH₃ | Do. |
| 76 | do | 2,5-disulfophenyl | Bromoacetic aicd chloride | H | CH₃ | Do. |
| 77 | do | do | 2,4,6-trichloropyrimidine | H | COOH | Greenish yellow. |
| 78 | do | do | 2,4,5,6-tetrachloropyrimidine | H | —CO—N(CH₃)₂ | Yellow. |
| 79 | do | do | 2,4-dichloro-5-chloromethylpyrimidine | H | —CO—NH—C₂H₅ | Do. |
| 80 | do | 4-sulfophenyl | β-(4′,5′-dichloro-6′-pyridazonyl-1′)propionic acid chloride | H | COOH | Greenish yellow. |
| 81 | do | do | 1,4-dichlorophthalazine-6-carboxylic acid chloride | H | COOH | Yellow. |
| 82 | do | do | β-benzenesulfonyloxy-propionic acid chloride | H | CH₃ | Greenish yellow. |
| 83 | do | 2,5-dichloro-4-sulfophenyl | 2,4-dibromopyrimidine-5-carboxylic acid chloride | CH₃ | COOH | Yellow. |
| 84 | do | 4-sulfophenyl | β-bromoethanesulfonic acid chloride | H | COOH | Yellow. |
| 85 | do | do | Chloroacetic acid chloride | H | COOH | Do.¹ |
| 86 | do | do | 2,4,6-trichloropyrimidine-5-methylpyrimidine-5-carboxylic acid chloride | H | COOH | Do.¹ |
| 87 | do | do | 2,4-dichloro-6-(1′-carboxyethylamino)-1,3,5-triazine | H | COOH | Do.¹ |
| 88 | 2-methyl-5-sulfophenyl | 2,4-dichloro-6-phenylamino-1,3,5-triazine-4-sulfonic acid | | H | —CO—NH—CH₃ | Do. |
| 89 | —CH=CH— with SO₃H groups (stilbene-sulfonic) | 2-methyl-4-sulfophenyl | 2,4-dichloro-6-naphthyl-2′-amino-1,3,5-triazine-6′-sulfonic acid | H | —CO—NH—C₂H₄—OH | Greenish yellow. |
| | | | 2,4,6-trichloro-5-ethylpyrimidine | H | CH₃ | Do. |

TABLE 1—Continued

| Example No. | Y | A₁ | R₁ = Radical of | R₂ | R₃ | Shade of dyeing |
|---|---|---|---|---|---|---|
| 90 | ![benzene-SO₃H] | 2-chloro-4-sulfophenyl | 2,4-dichloro-6-naphthyl-2′-amino-1,3,5-triazine-4′,8′-disulfonic acid | H | CH₃ | Do. |
| 91 | Same as above | 3-sulfophenyl | 2,4-dichloro-6-naphthyl-1′-amino-1,3,5-triazine-4′-sulfonic acid | H | CH₃ | Do. |
| 92 | do | do | 2,4-dichloro-6-(2′,5′-dicarboxyphenylamino)-1,3,5-triazine | H | CH₃ | Do. |
| 93 | do | do | 2,4-dibromo-5-bromomethyl-6-methylpyrimidine | H | CH₃ | Do.¹ |
| 94 | do | do | α,β-dichloropropionic acid chloride | H | CH₃ | Do.¹ |
| 95 | do | do | β-bromopropionic acid chloride | H | CH₃ | Do. |
| 96 | do | do | α-bromoacrylic acid chloride | H | CH₃ | Do. |
| 97 | do | 2,5-disulfophenyl | 2,3-dichloroquinoxaline-6-carboxylic acid chloride | H | CH₃ | Do. |
| 98 | do | do | 2-chloroquinoxaline-6-carboxylic acid chloride | H | CH₃ | Do. |
| 99 | do | do | 2,4-dichloro-6-N-β-hydroxyethyl-N-phenylamino-1,3,5-triazine | H | CH₃ | Do. |
| 100 | do | do | 4-(4′,5′-dichloro-6′-pyridazonyl-1′)-benzene-1-carboxylic acid chloride | H | CH₃ | Do. |
| 101 | do | do | 3-(4′,5′-dichloro-6′-pyridazonyl-1′)-benzene-1-carboxylic acid chloride | H | CH₃ | Do. |
| 102 | do | do | 2-chlorobenzoxazole-5-carboxylic acid chloride | H | CH₃ | Do. |
| 103 | do | do | 2,4-dichloro-6-β-ethoxyethylamino-1,3,5-triazine | H | CH₃ | Do. |
| 104 | do | do | 2,4-dichloro-6-(4′-chlorophenylamino)-1,3,5-triazine | H | CH₃ | Do. |
| 105 | do | do | 2,4-dichloro-6-γ-methoxypropylamino-1,3,5-triazine | H | CH₃ | Do. |
| 106 | do | do | 2,4-dibromo-6-phenylamino-1,3,5-triazine-5′,7′-disulfonic acid | H | CH₃ | Do. |
| 107 | do | 2,5-dichloro-4-sulfophenyl | 2,4-dichloro-6-naphthyl-1′-amino-1,3,5-triazine-4′-sulfonic acid | H | CH₃ | Do. |
| 108 | do | do | 2,4-dichloro-6-naphthyl-1′-amino-1,3,5-triazine-3′,6′-disulfonic acid | H | CH₃ | Do. |
| 109 | do | do | 2,4-dichloro-6-naphthyl-1′-amino-1,3,5-triazine-8′-sulfonic acid | H | CH₃ | Do. |
| 110 | ![CH=CH-bridged SO₃H] | 4-sulfophenyl | 2,4-dibromo-6-phenylamino-1,3,5-triazine-3′-sulfonic acid | H | CH₃ | Do. |
| 111 | ![biphenyl-SO₃H] | do | 2,4-dibromo-6-amino-1,3,5-triazine | H | CH₃ | Do. |
| 112 | Same as above | do | 2,4-dichloro-6-β-hydroxypropylamino-1,3,5-triazine | H | CH₃ | Do. |
| 113 | do | do | 2,4-dichloro-6-β-methoxyethylamino-1,3,5-triazine | H | COOH | Yellow. |
| 114 | do | do | 2,3-dibromoquinoxaline-6-carboxylic acid chloride | H | COOH | Do. |
| 115 | do | do | β-chloroethansulfonic acid chloride | H | CH₃ | Greenish yellow. |
| 116 | do | do | β-methylsulfonyloxypropionic acid chloride | H | CH₃ | Do. |
| 117 | do | 2-chloro-6-methyl-4-sulfophenyl | —CH₂—CH₂—O<br>SO₂—O—SO₂ | H | CH₃ | Do. |
| 118 | do | do | β-(4′-methylphenylsulfonyloxy)-propionic acid chloride | H | CH₃ | Do. |
| 119 | do | 2,5-disulfophenyl | 2,4-dichloro-6-chloromethylpyrimidine-5-carboxylic acid chloride | H | CH₃ | Do. |
| 120 | do | do | 2,3-dibromoquinoxaline-6-carboxylic acid chloride | H | CH₃ | Do. |
| 121 | do | do | 2,4-dichloro-6-(3′-carboxyphenylamino)-1,3,5-triazine | H | CH₃ | Do. |
| 122 | do | 4-sulfophenyl | 2,4-dichloro-6-N-carboxymethylamino-1,3,5-triazine | H | CH₃ | Do. |
| 123 | do | do | 2,4-dichloro-6-(4′-carboxyphenylamino)-1,3,5-triazine | H | CH₃ | Do. |
| 124 | do | do | 2,4,5-trichloropyrimidine-5-carboxylic acid | CH₃ | CH₃ | Do. |
| 125 | do | do | 2,4,5,6-tetrachloropyrimidine | H | CH₃ | Do. |
| 126 | do | do | Vinylsulfonic acid chloride | H | CH₃ | Do. |
| 127 | do | 2,5,6-trichloro-3-sulfophenyl | 2,4-dichloro-6-phenylamino-1,3,5-triazine-3′,5′-disulfonic acid | H | CH₃ | Do. |
| 128 | do | 2,5-dichloro-4-sulfophenyl | 2,4-dichloro-6-β-carboxyethylamino-1,3,5-triazine | H | CH₃ | Do. |
| 129 | do | do | 2,4-dichloro-6-naphthyl-2′-amino-1,3,5-triazine-6′,8′-disulfonic acid | H | CH₃ | Do. |
| 130 | do | do | 2,4-dichloro-6-naphthyl-1′-amino-1,3,5-triazine-4′,6′-disulfonic acid | H | CH₃ | Do. |
| 131 | do | 4-sulfophenyl | 2,4-dichloro-6-naphthyl-2′-amino-1,3,5-triazine-5′-sulfonic acid | H | CH₃ | Do. |
| 132 | do | 3-sulfophenyl | 2,4,5,6-tetrabromopyrimidine | H | CH₃ | Do. |
| 133 | do | 2,5-disulfophenyl | 5-bromo-2,4,6-trichloropyrimidine | H | CH₃ | Do. |
| 134 | do | do | 2-chlorobenzothiazole-6-sulfonic acid chloride | H | CH₃ | Do. |
| 135 | do | do | 2,4-dichloro-6-ethoxy-1,3,5-triazine | H | CH₃ | Do. |
| 136 | do | do | 2,4-dichloro-6-phenoxy-1,3,5-triazine | H | CH₃ | Do. |
| 137 | do | do | 2,4-dichloro-6-methoxy-1,3,5-triazine | H | CH₃ | Do. |

¹ Polyamide.

Formulae of representative dyes of the foregoing examples are as follows:
EXAMPLE 1
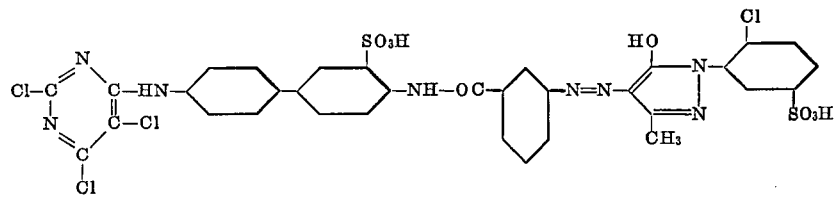
EXAMPLE 2
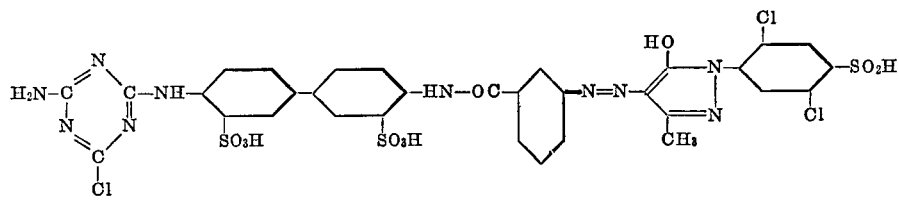
EXAMPLE 3
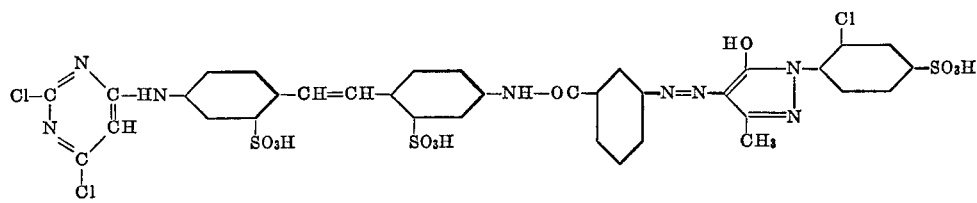
EXAMPLE 4
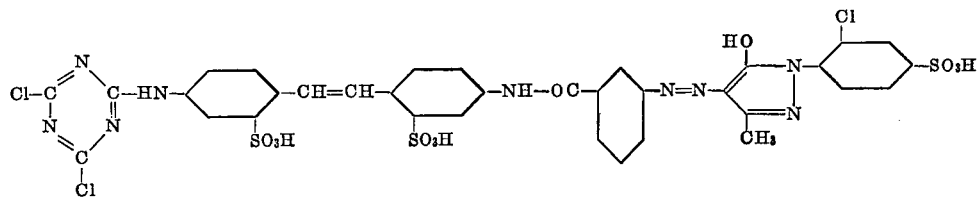
EXAMPLE 5
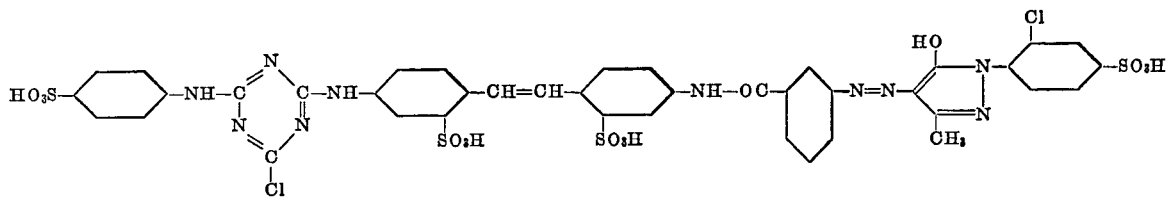
EXAMPLE 6
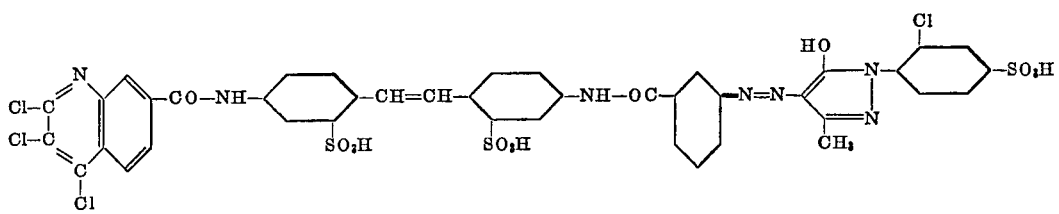
EXAMPLE 7
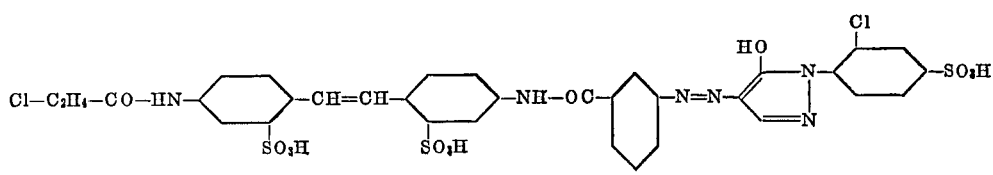

EXAMPLE 34

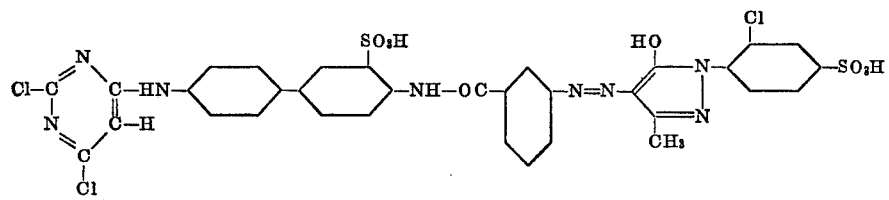

EXAMPLE 36

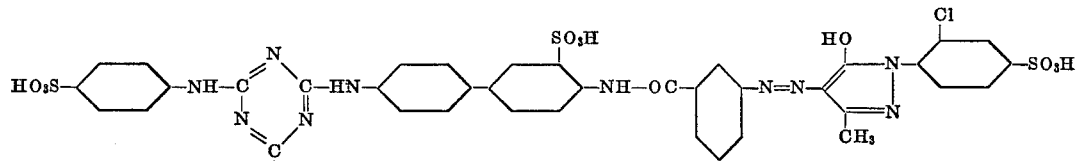

EXAMPLE 37

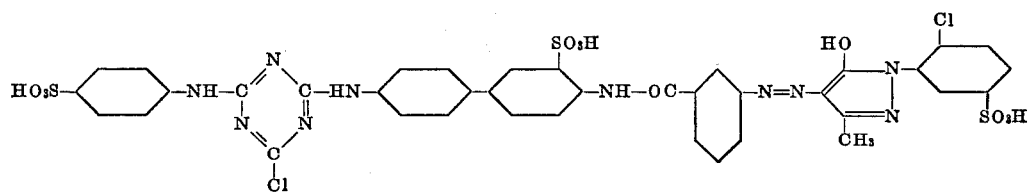

EXAMPLE 38

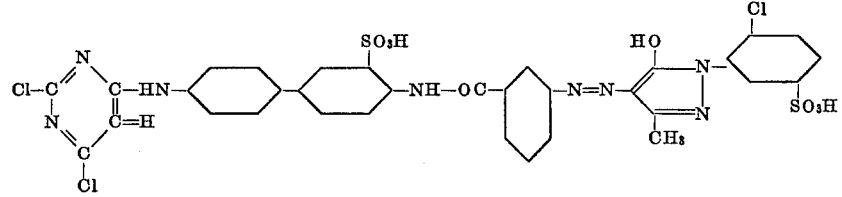

EXAMPLE 40

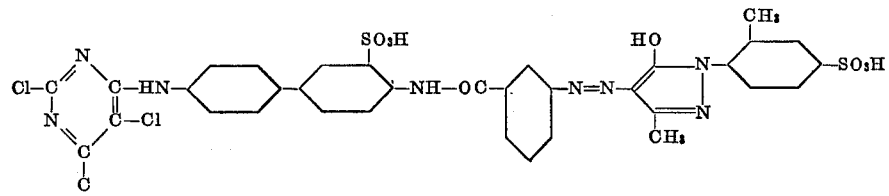

EXAMPLE 69

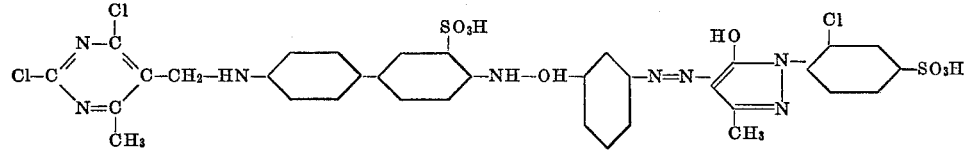

Having thus disclosed the invention what I claim is:
1. Reactive dye of the formula

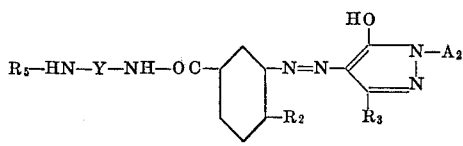

wherein $R_2$ is hydrogen, lower alkyl or chlorine;

$R_3$ is lower alkyl, —COOH, —COO-lower alkyl, —CO—$NH_2$, —CO—NH-lower alkyl, —CO—N(lower alkyl)$_2$ or —CO—NH-lower hydroxyalkyl;

$R_5$ is lower mono- or dihaloalanoyl; lower alkenoyl; lower mono-, di- or trihaloalkenoyl; lower alkane-sulfonyloxy-lower alkanoyl; mono-nuclear arylsulfonyloxy-lower alkanoyl; lower monohaloalkylsulfonyl; lower sulfatoalkylsulfonyl; lower alkenylsulfonyl; 2,4-dihalopyrimidyl-5-carbonyl; 2,4-dihalo-6-methylpyrimidyl-5-carbonyl; 2,3 - dihaloquinoxalyl-6-carbonyl, -6 - sulfonyl or -6-amino-carbonyl; 2(3)-monohaloquinoxalyl-6-carbonyl; 1,4-dihalophthalazy-6-carbonyl; 2-halobenzoxazolyl-5-carbonyl; 2-halo-benzothiazolyl-5-carbonyl or -6-sulfonyl; 3- or 4-(4′,5′-dihalo-6′-pyridazonyl-1′)-benzene-1-carbonyl or β-(4′,5′-dihalo-6′-pyridazonyl-1′)-propionyl; di- or trihalopyrimidyl; 2,4-dihalo-pyrimidyl-5-methylene or 2,4-dihalo-6-methylpyrimidyl-5-methylene; 4,6-dihalo-1,3,5-triazinyl-2; 4-lower alkoxy-6-halo-1,3,5-triazinyl-2; 4-mono-nuclear aryloxy-6-halo-1,3,5-triazinyl-2; 4-amino-6-halo-1,3,5-triazinyl-2 or 4-substituted amino-6-halo-1,3,5-triazinyl-2-; halo being chloro or bromo; lower meaning containing up to 4 carbon atoms; and the substituents of the amino group being selected from the group consisting of lower alkyl, lower hydroxyalkyl, lower alkoxy-lower alkyl, lower carboxyalkyl, lower sulfoalkyl, phenyl chlorophenyl, methylphenyl, carboxyphenyl, dicarboxyphenyl, sulfophenyl, dissulfophenyl, sulfonaphthyl, disulfonaphthyl, benzyl and cyclohexyl;

$A_2$ is mono- or disulfophenyl; mono- or disulfonaphthyl; methyl-sulfophenyl; monochloro-, dichloro- or trichlorosulfophenyl; or methyl-chloro-sulfophenyl; and Y is one of the radicals

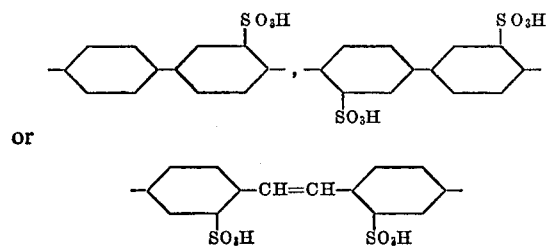

or wherein $A_3$ represents 3- or 4-sulfophenyl, 2,4-, 2,5- or 3,5- disulfophenyl, 2-chloro-4- or -5-sulfophenyl, 2-methyl-4- or -5-sulfophenyl, 2,5-dichloro-4-sulfophenyl or 2-chloro-6-methyl-4-sulfophenyl and $R_6$ represents 2,6-dichloro-5-hydrogen-pyrimidyl-4-, 4,6-di-dichloro-5-hydrogen-pyrimidyl-2, 2,5,6-trichloropyrimidyl-4, 2,4-dichloro-6-methyl-pyrimidyl-5-methylene, 4,6-dichloro-1,3,5-triazinyl-2, 6-chloro-4-amino-1,3,5-triazinyl-2,6-chloro-4-methylamino-1,3,5-triazinyl-2, 6-chloro-4-methoxy-1,3,5-triazinyl-2, 6-chloro-4-(3'- or 4'-sulfophenylamino)-1,3,5-triazinyl-2, β-chloropropionyl, acryloyl, α-chloro- or α-bromoacryloyl, β-(4',5'-dichloro-6'-pyridazonyl-1')-propionyl, 2,3-dichloroquinoxalyl-6-carbonyl or 2-chlorobenzothiazolyl-6-sulfonyl.

3. The reactive dye according to claim 1 of the formula

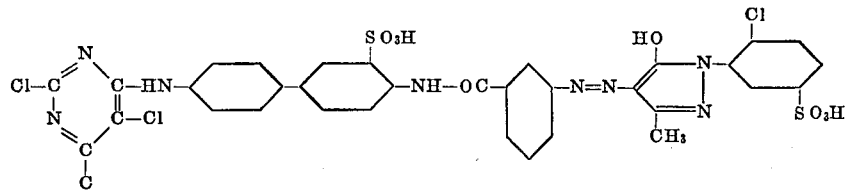

4. The reactive dye according to claim 1 of the formula

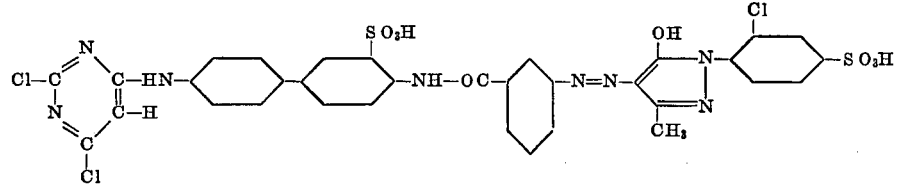

5. The reactive dye according to claim 1 of the formula

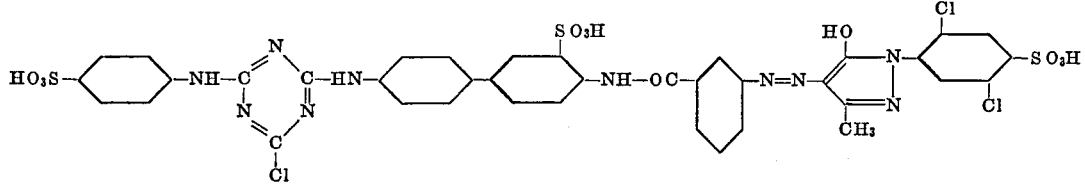

6. The reative dye according to claim 2 of the formula

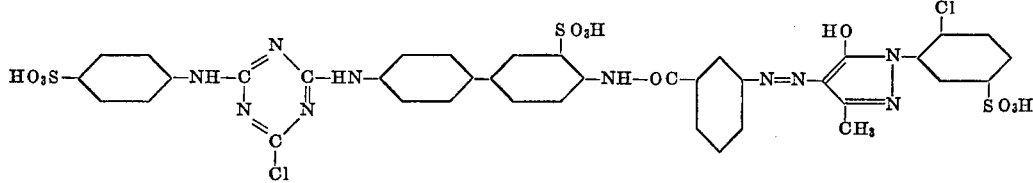

7. The reactive dye according to claim 2 of the formula

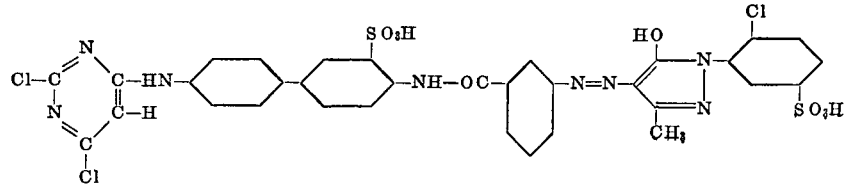

2. Reactive dye according to claim 1 of the formula

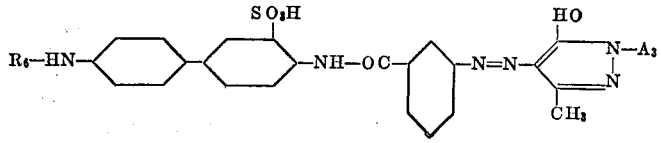

8. The reactive dye according to claim 1 of the formula
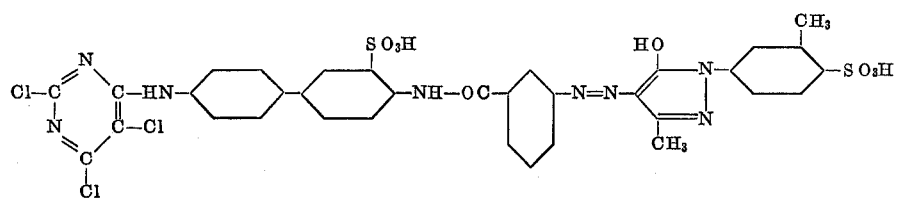
References Cited
FOREIGN PATENTS
1,139,796   4/1960   France.
CHARLES B. PARKER, Primary Examiner
D. M. PAPUGA, Assistant Examiner
U.S. Cl. X.R.
260—154, 158, 162, 249.5, 249.8, 251; 8—13, 41, 51, 54, 55

UNITED STATES PATENT OFFICE
CERTIFICATE OF CORRECTION

Patent No. 3,542,753                Dated    November 24, 1970

Inventor(s)  KURT BRENNEISEN

It is certified that error appears in the above-identified patent and that said Letters Patent are hereby corrected as shown below:

Column 1, line 46, "N⃫|R₃" should read --⫽|R₃--. Column 2, line 30, "cl" shc read --Cl--; line 67, "radical" should read --radical,--. Column 3, line "or" should read --or,--; line 68, "halogenoquinoxaline," should read --ha quinoxaline-,--. Column 6, line 62, "demium" should read --medium--; line 65, "85-90°" should read --85-95°--. Column 8, line 55, in the formula, "Cl|⟨" should read --Cl⟨-- . Column 10, Example 41, in the definition A₁, "4-meth 1-2-sulfophenyl" should read --4-methyl-2-sulfophenyl--. Colu Example 6, "⫽C⫽|Cl" should read --⫽N⫽--. Column 16, Example 2, "-SO₂H should read -- -SO₃H--; Example 7, "⫽N" should read -- ⫽=N--. Column line 72, "dihaloalanoyl" should read --dihaloalkanoyl--; Column 18, Exampl " ⟩-SO₃H" should read -- ⟩-SO₃H(CH₃)(Cl)--; 62, "dihalophthalazy-" should re --dihalophthalazyl- --. Column 19, line 1, "phenyl" should read --phenyl, line 2, "dissulfo-" should read --disulfo- --. Column 20, line 7, "di-dich should read --dichloro--.

Signed and sealed this 13th day of March 1973.

(SEAL)
Attest:

EDWARD M. FLETCHER, JR.                 ROBERT GOTTSCHALK
Attesting Officer                       Commissioner of Pate